Figure 1:
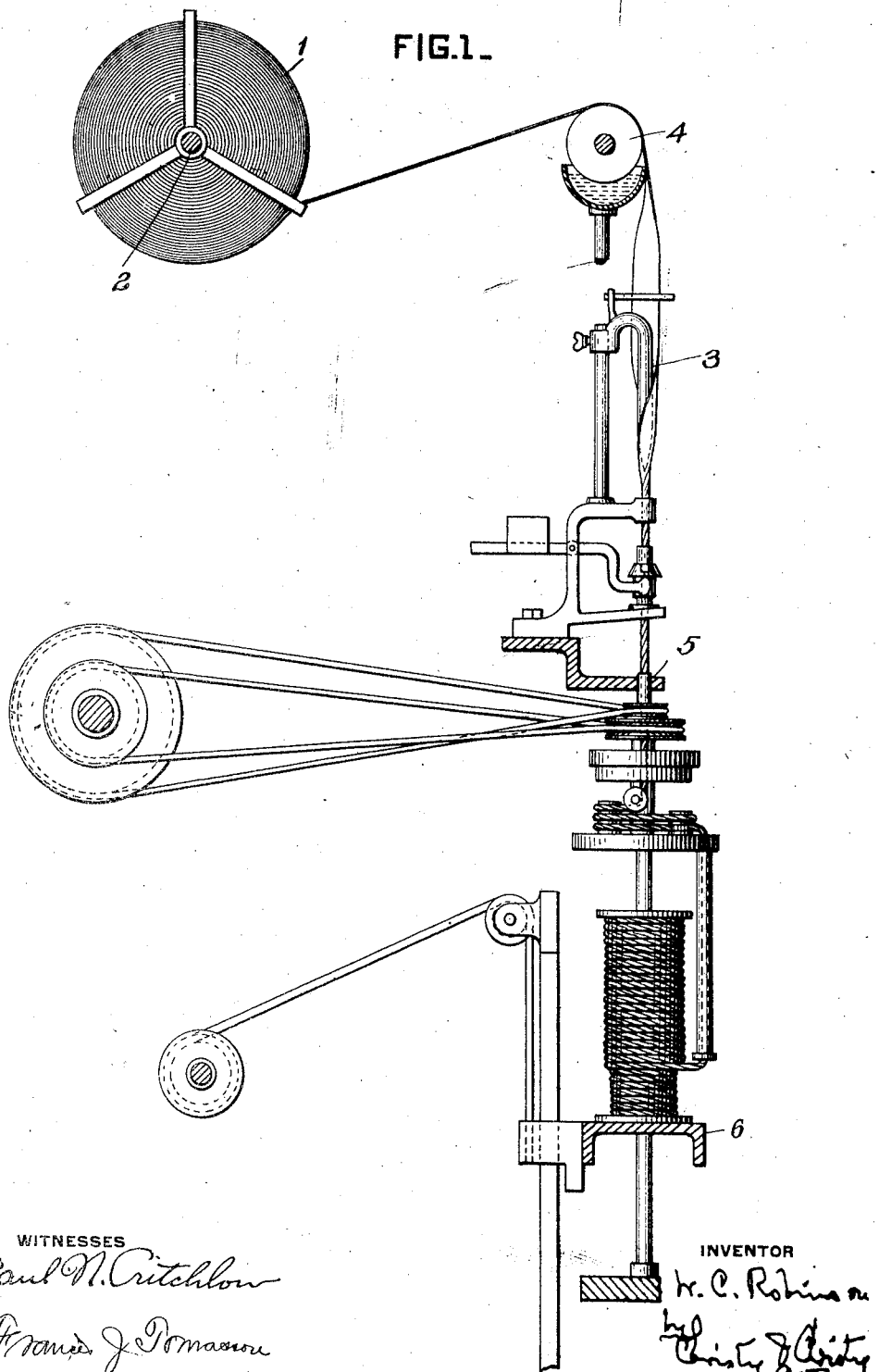

W. C. ROBINSON.
METHOD OF MANUFACTURING TUBULAR CONDUITS.
APPLICATION FILED MAR. 30, 1914.

1,111,806.

Patented Sept. 29, 1914.
2 SHEETS—SHEET 1.

WITNESSES

INVENTOR

W. C. ROBINSON.
METHOD OF MANUFACTURING TUBULAR CONDUITS.
APPLICATION FILED MAR. 30, 1914.

1,111,806.

Patented Sept. 29, 1914.
2 SHEETS—SHEET 2.

WITNESSES

INVENTOR

UNITED STATES PATENT OFFICE.

WILLIAM C. ROBINSON, OF PITTSBURGH, PENNSYLVANIA.

METHOD OF MANUFACTURING TUBULAR CONDUITS.

1,111,806.

Specification of Letters Patent. Patented Sept. 29, 1914.

Application filed March 30, 1914. Serial No. 828,336.

*To all whom it may concern:*

Be it known that I, WILLIAM C. ROBINSON, residing at Pittsburgh, in the county of Allegheny and State of Pennsylvania, a citizen of the United States, have invented or discovered certain new and useful Improvements in Methods of Manufacturing Tubular Conduits, of which improvements the following is a specification.

My invention relates to flexible tubular woven electrical conductor conduits, wherein there is a helical woof of twisted paper with which longitudinally extending binding threads or warp are interwoven.

The object of my invention is to improve the process of manufacturing such conduits, the improvements having to do particularly with the formation and treatment of the helical twisted paper woof.

Heretofore the usual practice has been to form the woof by twisting strips of thin paper into a substantially hard cylindrical body, the thickness of the conduit wall being determined by, or varied in accordance with, the diameter of such woof. Because of the desirability of having the conduit wall as thin as possible commensurate with the utility and efficiency of the conduit as a whole, the cylindrical twisted paper woofs have necessarily been made of relatively narrow strips of paper which form small diameter cords. In weaving the conduits of such small diameter woofs, the number of picks per unit length of the conduits is necessarily large and the speed of weaving correspondingly diminished. For two reasons, therefore, the manufacturing of such conduits is attended with undue expense, first, because the paper must be cut into relatively narrow strips requiring more time for twisting a unit weight thereof than if the strips were wider; and, secondly, because the weaving looms must move through more cycles of operation in weaving a small diameter woof than a larger one.

In the practice of my invention I form the woof of strips of paper materially wider than those used heretofore, and into a cylindrical body of less firmness than those usually employed in weaving the conduits. After the wide strip is twisted and allowed to age for a suitable period it is heated and then flattened and compressed into a strip of substantially the same thickness as and about twice as wide as the diameter of the cylindrical woof heretofore used. The firm woof thus formed is then woven into conduits having materially less picks per inch than cylindrical woof conduits, and hence requiring in its manufacture correspondingly less cycles of operation of the loom.

The machinery or apparatus for carrying out the several steps thus briefly described may be of any desired construction. In the accompanying sheets of drawing, forming part of my specification, I have illustrated, somewhat incompletely, machinery which may be used.

Figure 2:
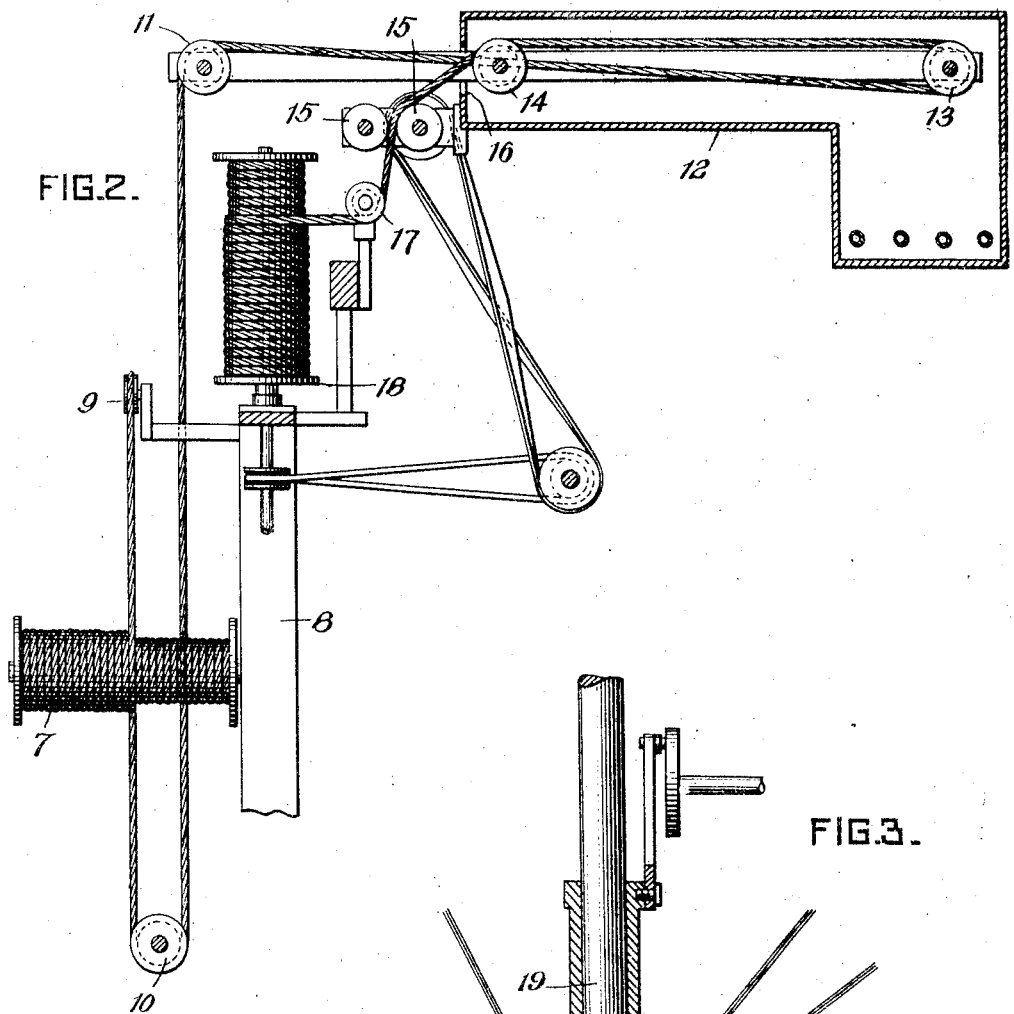

Figure 1 is an elevation of a twisting machine; Fig. 2 a vertical sectional view of a heating oven and flattening rolls; and Fig. 3 a vertical sectional view of a portion of a weaving loom.

Referring first to the paper twisting mechanism illustrated in Fig. 1, a roll of thin paper 1 having the desired width is rotatably mounted on a rod 2. As the strip passes from the roll 1 to a guide finger 3 it is moistened by means of a roller 4, which is partly immersed in a suitable solution, such as water and glue. The actual twisting and spooling is effected in the usual manner by means of a rotatable sleeve 5 and vertically movable spool holder 6. Since the mechanism for effecting these operations is clearly shown and well understood by those skilled in the art, it needs no further description. It will be observed, however, that the paper need not be as firmly twisted as when used as a conduit woof without subsequent treatment.

Figure 3:
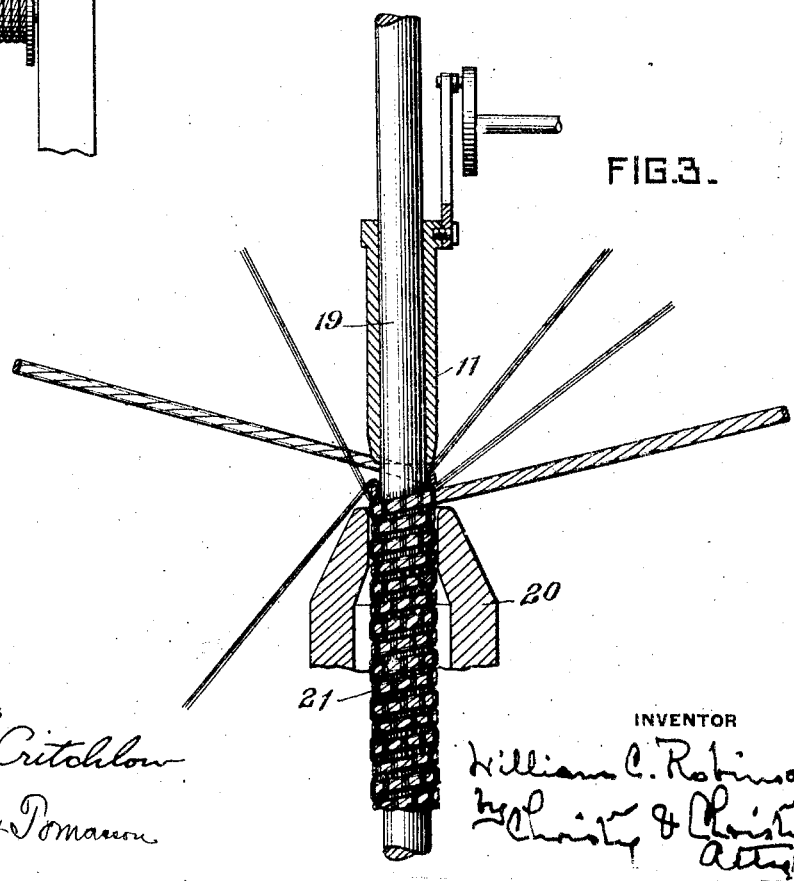

After twisting and spooling the paper as described, it is allowed to age for twenty-four to thirty-six hours, and is then passed through an oven and between a pair of flattening rolls. In the oven a large portion, if not all, the water is driven from the paper and the glue softened so that after the strip is flattened it retains its shape and is of the proper compactness for its intended purpose. This step in the process may be effected by means of the apparatus illustrated in Fig. 2. The spool 7, of properly aged twisted paper, is rotatably mounted on a support 8, the strip passing over idlers 9, 10 and 11 into and through the oven 12, in which there are also suitable idlers 13 and 14. The flattening rolls 15 are preferably arranged adjacent to oven opening 16, the strip passing between them and over an idler 17 to a suitably driven spool 18. The conduit may then be woven, as indicated in Fig. 3, upon a spindle 19 extending through a suitable frame 20, the flattened twisted paper woof 21 being wound helically upon the spindle with a flat side adjacent thereto, as clearly shown.

I claim as my invention:

1. The herein described method of manufacturing flexible tubular conduits, which consists in twisting into cylindrical form a relatively wide strip of thin paper previously moistened by an adhesive solution, passing the twisted paper strip through a heating and drying oven, flattening the strip while in a heated condition, and weaving a conduit wherein the flattened strip forms a helical woof.

2. The herein described method of manufacturing flexible tubular conduits, which consists in twisting into cylindrical form a relatively wide strip of thin paper previously moistened by an adhesive solution, flattening and compressing the strip, and weaving a conduit wherein the flattened strip forms a helical woof.

In testimony whereof I have hereunto set my hand.

WILLIAM C. ROBINSON.

Witnesses:
FRANCIS J. TOMASSON,
NORMAN H. WERNER.